United States Patent
Noro

(10) Patent No.: US 7,337,938 B2
(45) Date of Patent: Mar. 4, 2008

(54) ULTRASONIC BONDING HONE AND ULTRASONIC WELDING METHOD

(75) Inventor: Takashi Noro, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/209,698

(22) Filed: Aug. 24, 2005

(65) Prior Publication Data

US 2006/0043150 A1    Mar. 2, 2006

(30) Foreign Application Priority Data

Aug. 24, 2004  (JP)  ............................ 2004-243457
Jul. 20, 2005  (JP)  ............................ 2005-209431

(51) Int. Cl.
*B23K 1/06*   (2006.01)
*B32B 37/00*  (2006.01)

(52) U.S. Cl. .................... 228/1.1; 156/580.1

(58) Field of Classification Search ............. 228/1.1, 228/110.1

See application file for complete search history.

(56) References Cited

U.S. PATENT DOCUMENTS

| | | | | |
|---|---|---|---|---|
| 3,661,667 A | * | 5/1972 | Gardner et al. | ............ 156/73.4 |
| 3,867,232 A | * | 2/1975 | Thompson et al. | ......... 156/502 |
| 4,029,538 A | * | 6/1977 | Vance, Jr. | .................... 156/502 |
| 4,131,505 A | * | 12/1978 | Davis, Jr. | ................ 156/580.1 |
| 4,909,871 A | * | 3/1990 | Todo et al. | ................ 156/73.1 |
| 5,096,532 A | * | 3/1992 | Neuwirth et al. | ........ 156/580.1 |
| 5,110,403 A | * | 5/1992 | Ehlert | ...................... 156/580.1 |
| 5,273,799 A | * | 12/1993 | Yu et al. | ........................ 428/57 |
| 5,755,902 A | * | 5/1998 | Reynolds | .................... 156/73.1 |
| 6,835,259 B1 | * | 12/2004 | Smith et al. | ............... 156/73.4 |
| 2003/0155403 A1 | * | 8/2003 | Haregoppa et al. | ...... 228/110.1 |

FOREIGN PATENT DOCUMENTS

| | | | |
|---|---|---|---|
| JP |   | 58-42049 A | 3/1983 |
| JP |   | 58042049 A | * 3/1983 |
| JP |   | 62264977 A | * 11/1987 |

* cited by examiner

*Primary Examiner*—Kiley Stoner
(74) *Attorney, Agent, or Firm*—Sughrue Mion, PLLC

(57) ABSTRACT

An ultrasonic bonding hone is provided with a bonding pressing surface which extends in one direction and on which ultrasonic wave energy is concentrated. The bonding pressing surface is provided with a pair of protrusions extending in parallel to the direction in which the bonding pressing surface extends on opposite sides of the bonding pressing surface spaced from each other in the direction of width of the bonding pressing surface.

4 Claims, 7 Drawing Sheets

FIG.7

| | $\alpha \geq 1.3$ | $1.3 > \alpha \geq 1.2$ | $1.2 > \alpha \geq 1.1$ | $1.1 > \alpha \geq 1.0$ | $1.0 > \alpha \geq 0.9$ | $0.9 > \alpha \geq 0.8$ | $0.8 > \alpha \geq 0.7$ |
|---|---|---|---|---|---|---|---|
| SQUEEZE-OUT | × | × | △ | ○ | ○ | ○ | ○ |
| BONDING STRENGTH | × | △ | ○ | ◎ | ○ | △ | × |

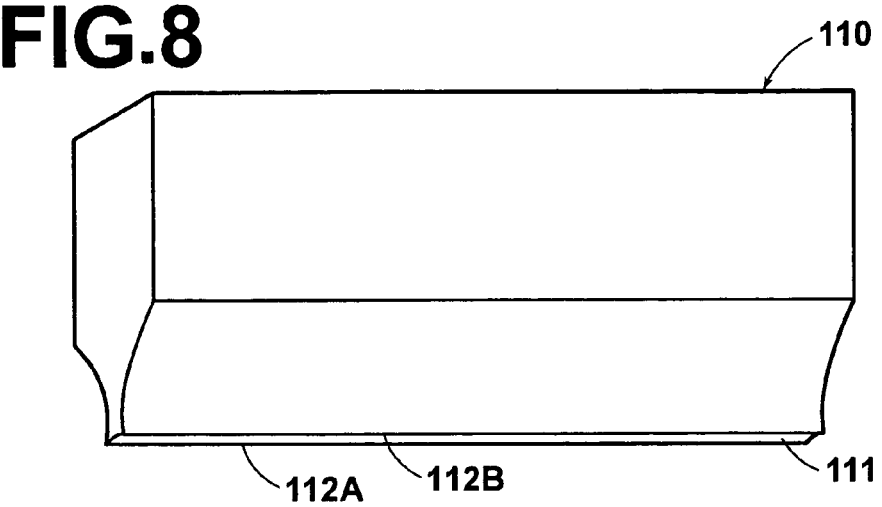
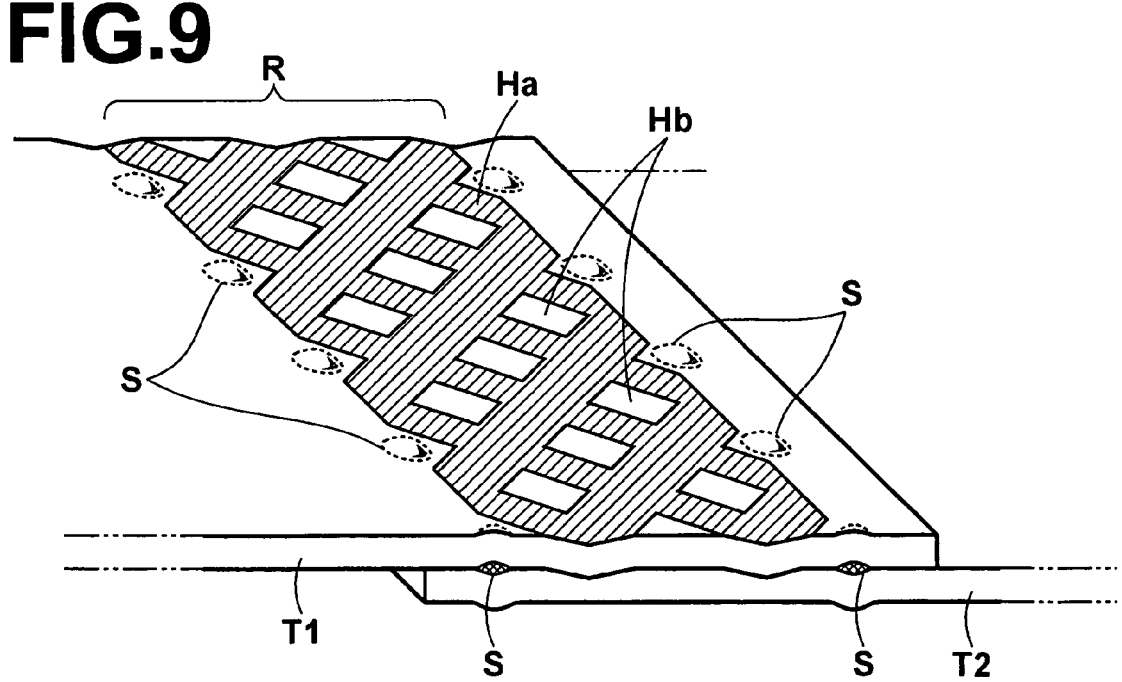

ULTRASONIC BONDING HONE AND ULTRASONIC WELDING METHOD

BACKGROUND OF THE INVENTION

1. Field of the Invention

This invention relates to an ultrasonic bonding hone provided with a bonding pressing surface which extends in one direction and on which ultrasonic wave energy is concentrated, and to a method of ultrasonic welding using the ultrasonic bonding hone.

2. Description of the Related Art

In an automatic printing system which prints on a photographic paper by the use of a developed silver-salt photographic film, a roll of a photographic paper (will be simply referred to as "photographic paper roll", hereinbelow) is used and the print is continuously made on the photographic paper roll while unrolling the photographic paper roll in the longitudinal direction. The photographic paper roll is prepared by rolling in a predetermined length a raw photographic paper split in a predetermined width and cutting it. When rolling the photographic paper roll, the trailing end portion of the raw photographic paper which is short of the predetermined length is bonded to the leading end portion of the raw photographic paper to be supplied next.

The photographic papers are bonded by ultrasonic welding. In this system, end portions of a pair of raw photographic papers to be bonded are overlaid one on the other, and a bonding pressing surface of an ultrasonic bonding hone on which ultrasonic wave energy is concentrated is pressed against the overlaid end portions to bond them. Further, there has been a system where an ultrasonic bonding hone with a knurled circumferential bonding pressing surface is used and the bonding pressing surface is pressed against the overlaid end portions while the ultrasonic bonding hone is being rotated. (See Japanese Unexamined Patent Publication No. 58(1983)-042049.)

The raw photographic paper comprises an emulsion layer, a resin layer, a cellulose (paper) layer and a resin layer laminated in this order, and resin layers of the pair of raw photographic papers are melt and flow together with the emulsion layers by the ultrasonic energy propagated through the bonding pressing surface in the ultrasonic welding. The fluidized body comprising the resin layers and the emulsion layers flows from the area where the pressing force is larger to the area where the pressing force is smaller, that is, according to high and low of the knurling and cured, whereby the overlaid photographic papers are bonded.

At this time, the emulsion layers are taken in by the molten resin and flow together with the molten resin. Though not flowing at this time, the cellulose layers deform in response to the pressing force by the bonding pressing surface and flowing of the fluidized body by the pressing force. For example, as shown in FIG. 9, there are formed in a pair of raw photographic papers T1 and T2, recesses Ha which are deformed by projections of the knurled surface and projections Hb which have not been deformed by projections of the knurled surface and correspond to recesses of the knurled surface.

In the ultrasonic welding, the fluidized body sometimes flows into an area on the raw photographic papers T1 and T2 outside the area R where the raw photographic papers T1 and T2 are pressed by the bonding pressing surface. The fluidized body flowing into such an area can be cured without being pressed to generate granular blocks S on the raw photographic papers T1 and T2 in the area outside the area R (FIG. 9). In this case, the blocks S are pinched between the photographic papers to leave pressing marks by the blocks S on the photographic papers when the raw photographic papers are rolled into a photographic paper roll, and the pressing marks deteriorate the quality of the photographic paper roll. That is, the quality of photographic paper roll sometimes deteriorates due to generation of the blocks S in the ultrasonic welding.

SUMMARY OF THE INVENTION

In view of the foregoing observations and description, the primary object of the present invention is to provide an ultrasonic bonding hone and a method of ultrasonic welding which can suppress deterioration of bonding quality in the ultrasonic welding.

In accordance with the present invention, there is provided an ultrasonic bonding hone provided with a bonding pressing surface which extends in one direction and on which ultrasonic wave energy is concentrated, wherein the improvement comprises that the bonding pressing surface is provided with a pair of protrusions extending parallel to said one direction on opposite sides of the bonding pressing surface spaced from each other in the direction of width of the bonding pressing surface.

The bonding pressing surface may be a circumferential surface.

In accordance with the present invention, there is further provided a method of ultrasonic welding using the ultrasonic bonding hone and comprising the step of, when the ultrasonic welding is performed by concentrating ultrasonic energy on webs having laminated molten layers through the bonding pressing surface while pressing the webs with the bonding pressing surface, substantially equalizing the amount of flow of the molten layers which is melt and flows between the protrusions to the volume of a groove on the bonding pressing surface.

The molten layers need not be a layer which is melt when the ultrasonic energy is provided but may be a layer which, though itself is not melt, becomes fluidized by taken in by a fluidized body which is melt and flows when the ultrasonic energy is provided.

The volume of the groove on the bonding pressing surface can be expressed as a maximum volume of the fluidized body that is accommodated in the groove when the ultrasonic welding is performed.

The ratio of the amount of flow of the molten layers to the volume of the groove on the bonding pressing surface is preferably not smaller than 0.8 to not larger than 1.1, and more preferably not smaller than 0.9 to not larger than 1.0.

The "extends in one direction" means not only that the bonding pressing surface linearly extends in one direction but also that the bonding pressing surface extends in one direction along a curved surface.

In accordance with the ultrasonic bonding hone of the present invention, since a pair of protrusions extending parallel to said one direction on opposite sides of the bonding pressing surface spaced from each other in the direction of width thereof are provided, when the ultrasonic welding is performed by the use of this ultrasonic bonding hone, the protrusions prevent the fluidized body which is fluidized when the ultrasonic energy is provided from flowing into an area outside the bonding pressing surface and accordingly generation of granular blocks outside the bonding pressing surface can be suppressed, whereby deterioration in bonding quality in the ultrasonic welding can be suppressed and deterioration of the quality of photographic paper roll due to generation of the pressing marks can be avoided.

In accordance with the method of ultrasonic welding using the ultrasonic bonding hone of the present invention, since when the ultrasonic welding is performed by concentrating ultrasonic energy on webs having laminated molten layers through the bonding pressing surface while pressing the webs with the bonding pressing surface, the amount of flow of the molten layers which is melt and flows between the protrusions is substantially equalized to the volume of a groove on the bonding pressing surface, generation of granular blocks outside the bonding pressing surface can be suppressed in the similar manner described above and at the same time, the web bonding strength can be held to a predetermined strength. That is, when the amount of flow of the molten layers is smaller than a predetermined value, the amount of flow of the molten body beyond the protrusions becomes small, whereby generation of granular blocks becomes smaller though the web bonding strength becomes weaker, whereas when the amount of flow of the molten layers is larger than a predetermined value, the amount of flow of the molten body beyond the protrusions becomes large, whereby generation of granular blocks becomes larger though the web bonding strength becomes stronger.

BRIEF DESCRIPTION OF THE DRAWINGS

FIG. 7 is a view showing the relation between the fluidized ratio and the web bonding strength and the relation between the fluidized ratio and the squeeze-out of the fluidized body from the bonding pressing surface, FIG. 8 is a perspective view showing an ultrasonic bonding hone having a flat bonding pressing surface, and FIG. 9 is a view showing webs bonded with an ultrasonic bonding hone having a knurled bonding pressing surface.

DESCRIPTION OF THE PREFERRED EMBODIMENT

Figure 1:
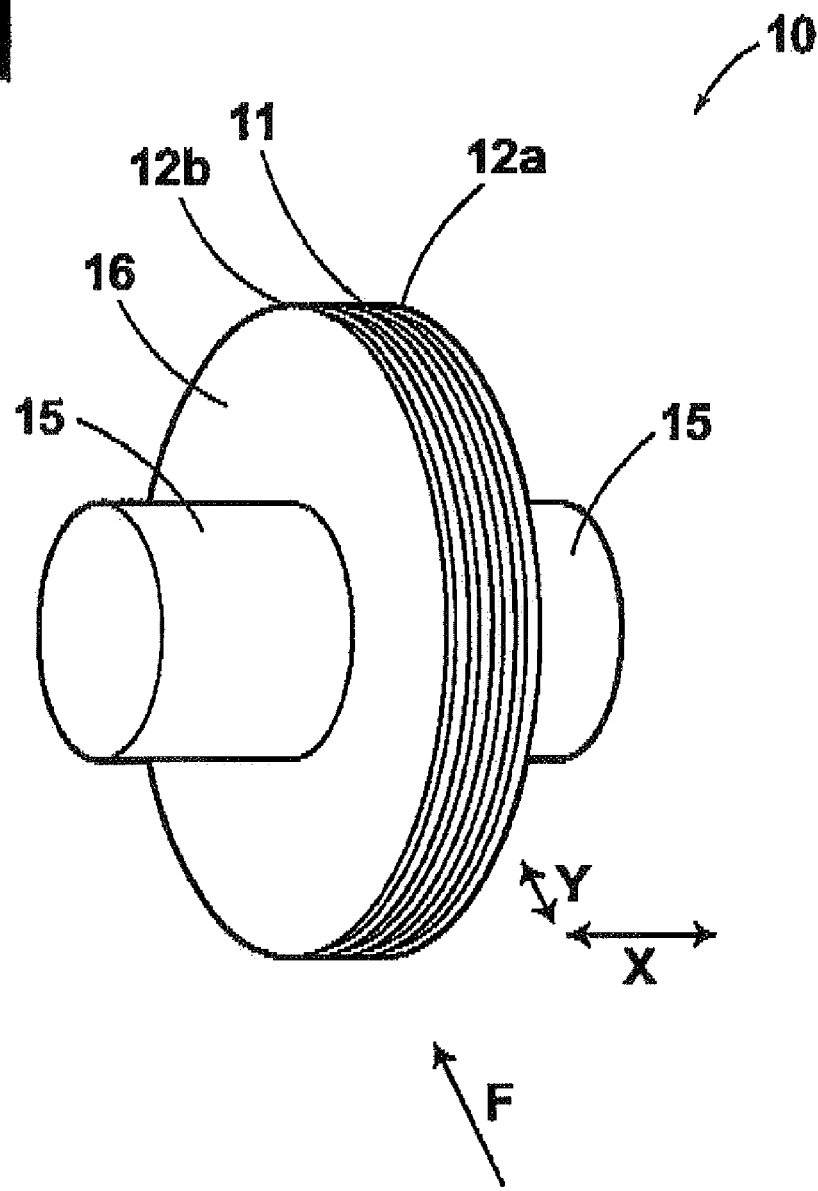
FIG. 1 is a fragmentary view of an ultrasonic bonding hone in accordance with an embodiment of the present invention.
Figures 2A, 2B:
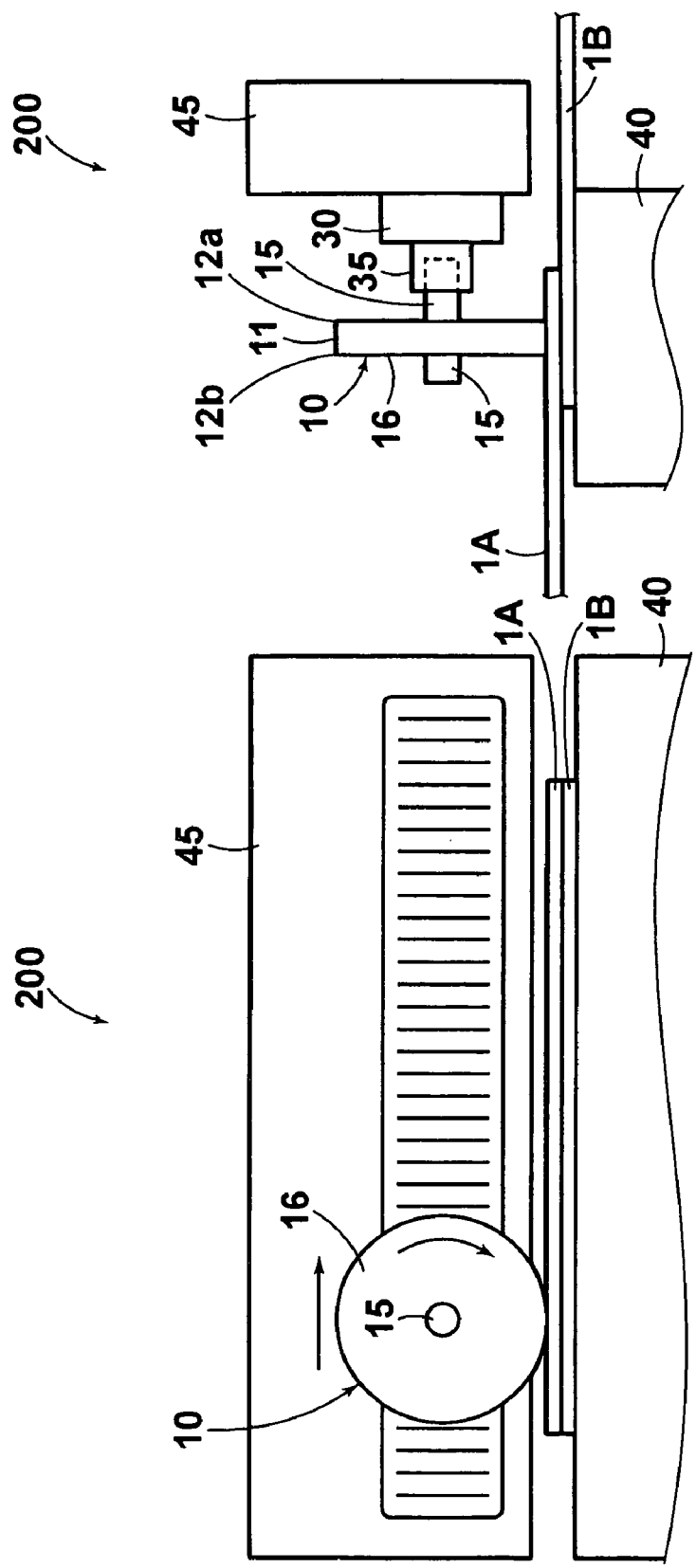
FIG. 2A is a side view of an ultrasonic welding system employing an ultrasonic bonding hone.
FIG. 2B is a front view of the same.

As shown in FIGS. 1, 2A and 2B, an ultrasonic bonding hone 10 of an embodiment of the present invention comprises a bonding pressing surface 11 which extends in one direction and on which ultrasonic wave energy propagated from an ultrasonic wave source (to be described later) is concentrated and the bonding pressing surface 11 is provided with a pair of protrusions 12a and 12b extending in the longitudinal direction of the bonding pressing surface 11 (a direction parallel to said one direction) spaced from each other in the direction of width of the bonding pressing surface 11 (shown by arrow Y in FIGS. 1, 2A and 2B). The protrusions 12a and 12b are not discontinuous in the circumferential direction.

An ultrasonic welding system 200 employing an ultrasonic bonding hone 10 which bonds the photographic papers 1A and 1B in a continuous length (webs to be bonded) comprises an ultrasonic oscillator 30 (the ultrasonic wave source), a table 40 on which longitudinal end portions of the photographic papers 1A and 1B are placed, and a conveyor means 45 which conveys the ultrasonic oscillator 30 in the direction of width (shown by arrow Y in FIGS. 2A and 2B) transverse to the longitudinal direction. The ultrasonic oscillator 30 is provided with a rotatable shaft 35 which is connected to the hone 10 and propagates the ultrasonic oscillation to the hone 10. The shaft 35 doubles the path of propagation through which the ultrasonic oscillation is propagated to the hone 10 and the rotary shaft of the hone 10 which is rotated in response to conveyance of the ultrasonic oscillator 30 by the conveyor means 45.

The lengthwise oscillation of the ultrasonic oscillator 30 in the axial direction (shown by arrow x in FIGS. 2A and 2B) is propagated to the hone 10 by way of the shaft 35 and then converted to the lengthwise oscillation toward a radial direction of the hone 10. By this, the lengthwise oscillation can be applied to the photographic papers 1A and 1B overlaid one on the other on the table 40 in the direction of their thicknesses. Accordingly, when the ultrasonic oscillator 30 generates ultrasonic oscillation while the photographic papers 1A and 1B overlaid one on the other on the table 40 are pressed by the bonding pressing surface 11 of the hone 10, the photographic papers 1A and 1B can be bonded. The photographic papers 1A and 1B can be bonded over the entire width by providing the photographic papers 1A and 1B with ultrasonic energy through the bonding pressing surface 11 while pressing them with the hone 10 and conveying the ultrasonic oscillator 30 by the conveyor means 45 to move the hone 10 in the direction of width (shown by arrow Y in FIGS. 2A and 2B) while rotating about the shaft 35.

The conveyor means 45 may be arranged by known mechanical elements and the like. More specifically, a ball-rail system, an air slide system or the like can be employed as a mechanism for moving and guiding a mechanical element, and a rack-pinion mechanism, a ball screw—ball bush mechanism, a belt drive mechanism, a piston-cylinder mechanism or the like can be employed as a drive force transmission mechanism. Further, a rotary motor, a linear motor, a hydraulic actuator, a pneumatic actuator or the like can be employed as a drive source for a mechanical element.

The hone 10 is formed by machining nickel chrome steel and comprises a cylindrical connecting shaft 15 which is connected to the shaft 35 of the ultrasonic oscillator 30 and a disk-like hone body 16 which is disposed outside the connecting shaft 15 coaxially therewith. The outer peripheral surface of the hone body 16 forms the bonding pressing surface 11 (FIG. 1). The connecting shaft 15 is connected to the shaft 35 of the ultrasonic oscillator 30 to integrate the hone 10 and the shaft 35.

Figure 3:
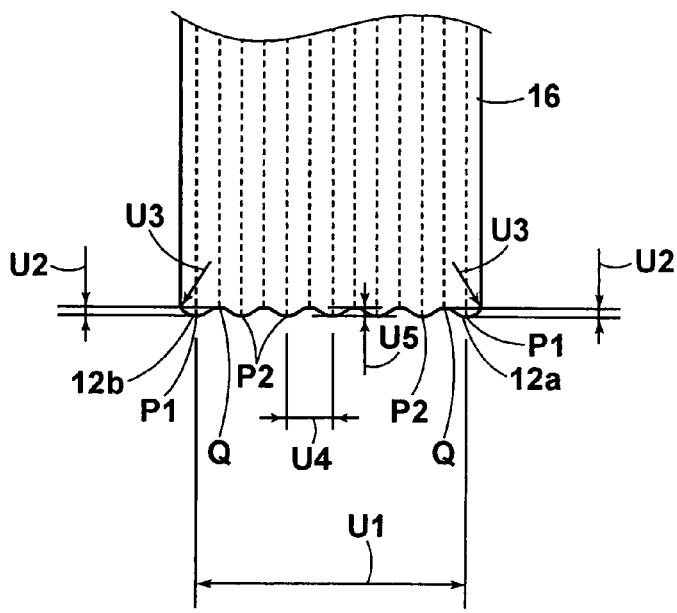
FIG. 3 is an enlarged view of a part of the bonding pressing surface of the ultrasonic bonding hone as seen in the direction of arrow F in FIG. 1, FIGS. 4A to 4D are views showing examples of the pattern of projections and recesses on the bonding pressing surface.

As can be seen also from FIG. 3 which is an enlarged view as seen in the direction of arrow F in FIG. 1, projections and recesses between the protrusions 12a and 12b which are spaced from each other in the direction of width are formed in a stripe pattern comprising a plurality of projections extending in the same direction as the protrusions 12a and 12b. See FIG. 4A. As shown in FIG. 3, the space U1 between the protrusions 12a and 12b is 4.6 mm, the distances U2 between the tops P1 of the protrusions 12a and 12b and the bottom Q of a recess on the bonding pressing surface 11 are the same in the protrusions 12a and 12b and are 0.1 mm, the radii U3 of curvature of chamfers of the protrusions 12a and 12b at the side i.e., at respective opposite exterior circumferential sides or edges as shown in FIG. 3) of the hone body 16 are the same in the protrusions 12a and 12b and are 0.2 mm, the pitches U4 of the stripe pattern, which is the pattern of the projections and the recesses for pressing between the protrusions 12a and 12b are 0.76 mm, and the distances U5 between the tops P2 of the projections of the stripe pattern and the bottom Q of a recess on the bonding pressing surface 11 (the bottom of a recess in the stripe pattern) are the same and are 0.1 mm. That is, distances of the protrusions 12a and 12b and each projection in the stripe pattern from the rotary axis of the connecting shaft 15 and the shaft 35 are equal to each other.

Figure 4A:
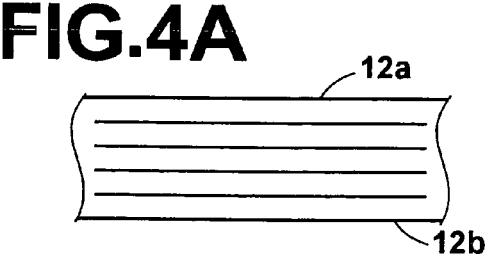
Figure 4C:
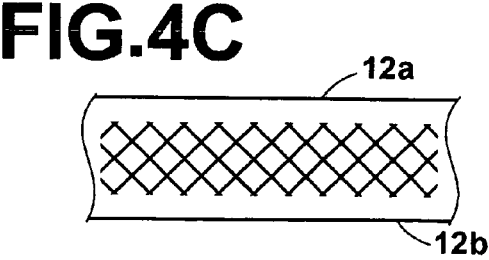
Figure 4B:
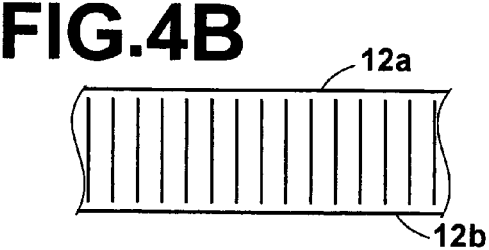
Figure 4D:
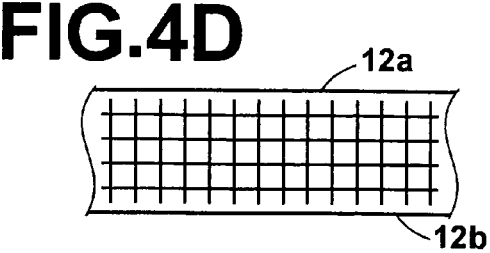

The pattern of the pressing projections and recesses need not be limited to a stripe pattern extending in the longitudinal direction as shown in FIG. 4A but may be, for instance, a stripe pattern extending in the transverse direction as shown in FIG. 4B, a knurling pattern shown in FIG. 4C or a lattice pattern shown in FIG. 4D.

Figure 5:
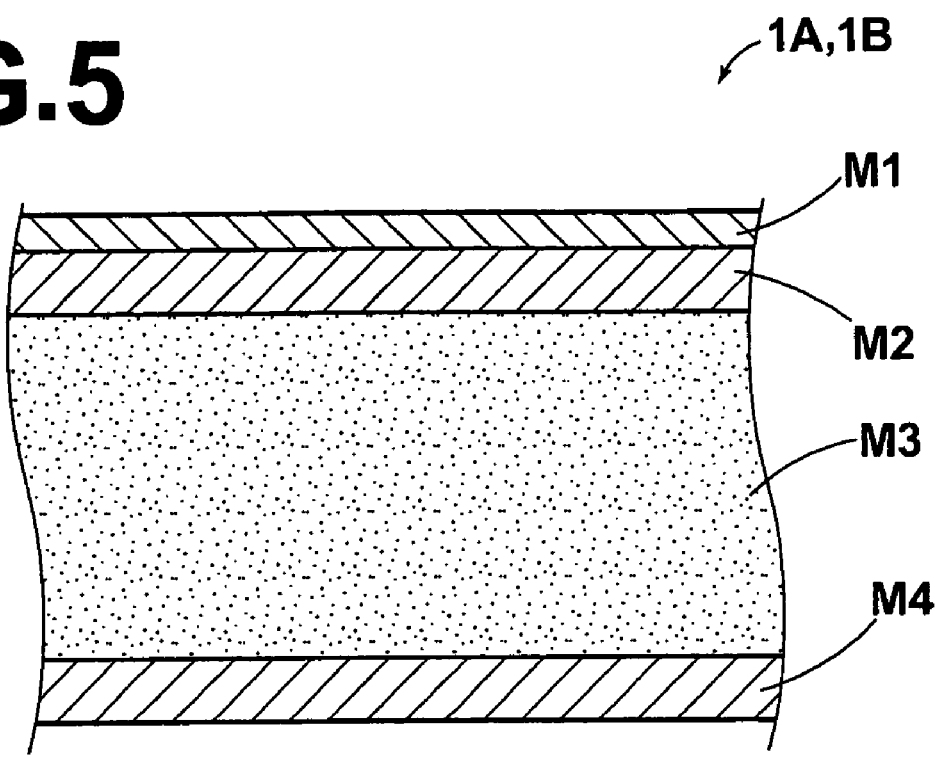
FIG. 5 is a fragmentary cross-sectional view showing the layer arrangement of the photographic paper.

Ultrasonic welding for bonding the photographic papers 1A and 1B will be described in detail, hereinbelow. FIG. 5 is a view showing an arrangement of the photographic paper, FIGS. 6A and 6B are views showing the photographic papers pressed by the bonding pressing surface, FIG. 7 is a view showing the relation between the fluidized ratio and the web bonding strength and the relation between the fluidized ratio and the squeeze-out of the fluidized body from the bonding pressing surface, and FIG. 8 is a view showing an ultrasonic bonding hone having a flat bonding pressing surface.

The photographic papers 1A and 1B are of the same structure, and as shown in FIG. 5, each of the photographic papers 1A and 1B comprises an emulsion layer M1 10 μm thick, a resin layer M2 of polyethylene resin 20 μm thick, a cellulose layer M3 160 μm thick, and a resin layer M4 of polyethylene resin 20 μm thick, which are laminated in this order. The cellulose layer M3 is a layer formed of so-called a paper.

When the hone 10 is conveyed across the photographic papers 1A and 1B overlaid one on the other on the table 40 by the conveyor means 45 while pressing the photographic papers 1A and 1B, the photographic papers 1A and 1B generate heat by the ultrasonic energy provided by the ultrasonic oscillator 30 by way of the bonding pressing surface 11 and the resin layers M2 and M4 of the photographic papers 1A and 1B are melt under the heat and solidified, whereby the photographic papers 1A and 1B are bonded together.

Figure 6:
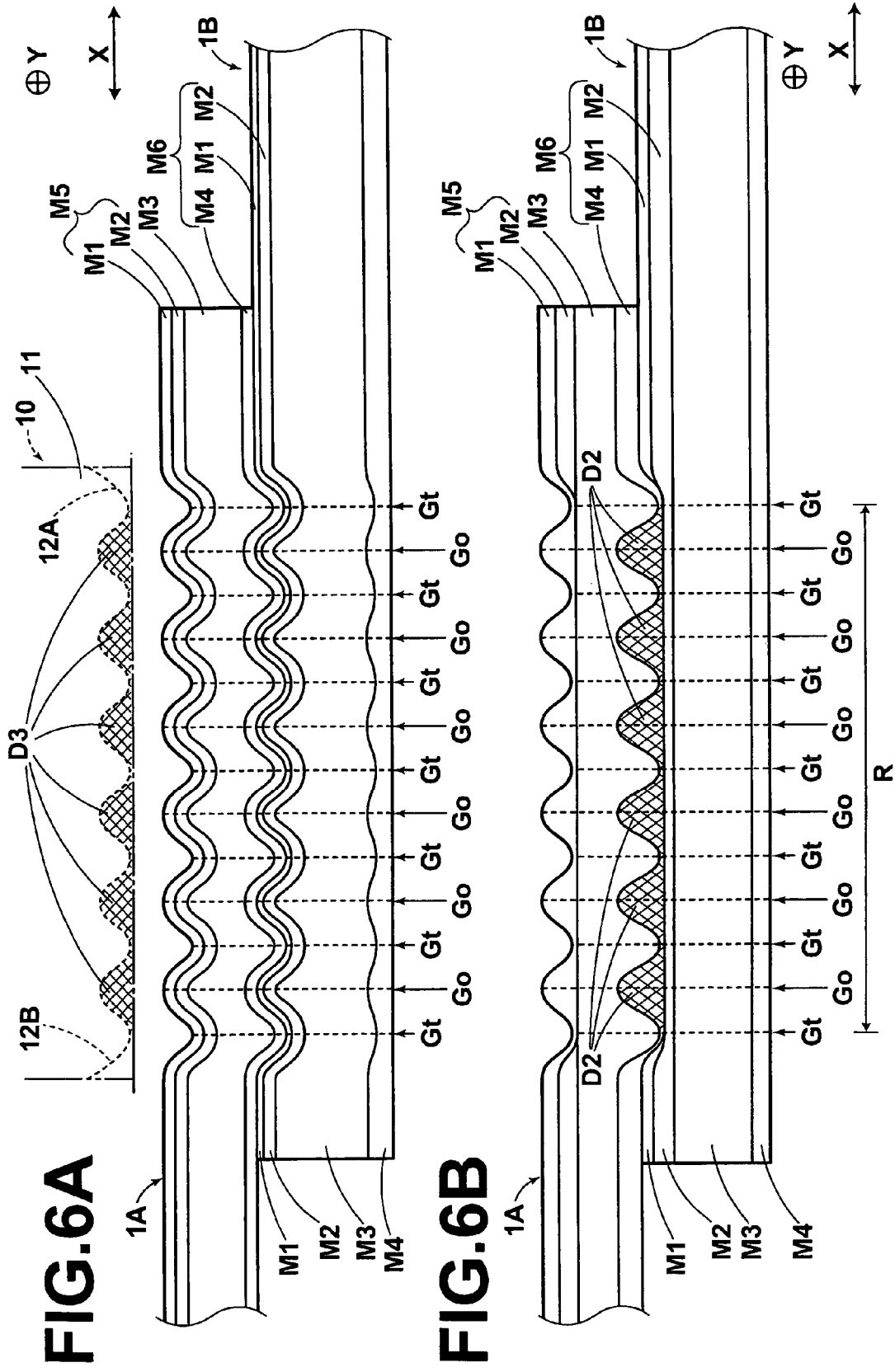
FIGS. 6A and 6B are views showing the photographic papers pressed by the bonding pressing surface.

That is, when pressed by the bonding pressing surface 11, the photographic papers 1A and 1B are once deformed to conform to the projections and recesses on the bonding pressing surface 11 under the pressure of the protrusions 12a and 12b and the projections forming the stripe pattern extending in the same direction as the protrusions 12a and 12b as shown in FIG. 6A. Thereafter, the photographic papers 1A and 1B generate heat by the ultrasonic energy by way of the bonding pressing surface 11 and the resin layers M2 and M4 and the emulsion layer M1 of the photographic papers 1A and 1B form a fluidized body which is flowable. The fluidized body flows from the areas Gt opposed to the protrusions 12a and 12b and the projections forming the stripe pattern to the areas Go which are adjacent to the areas Gt and opposed to the recesses of the bonding pressing surface 11 where the pressure is relatively weak under the pressure of the protrusions 12a and 12b and the projections forming the stripe pattern. Since being hard and very thin, the emulsion layer M1 is broken in response to flow of the resin layers M2 and M4 and taken in the molten resin layers M2 and M4 to form a part of the fluidized body. Accordingly, the amount of flow of the molten layers includes the emulsion layer taken in the fluidized body. In the following, the layer formed by the resin layer M2 and the emulsion layer M1 of the photographic paper 1A will be referred to as a "molten layer M5", and the layer formed by the resin layer M4 of the photographic paper 1A and the resin layer M2 and the emulsion layer M1 of the photographic paper 1B will be referred to as a "molten layer M6". As a result of flow of the molten layers M5 and M6, as shown in FIG. 6B, the fluidized body comprising the molten layers M5 and M6 moves from the areas Gt opposed to the protrusions 12a and 12b and the projections forming the stripe pattern to the areas Go which are adjacent to the areas Gt and opposed to the recesses of the bonding pressing surface 11 and is solidified.

Since flow of the fluidized body comprising the molten layers M5 and M6 between the protrusions 12a and 12b is limited by the protrusions 12a and 12b, the fluidized body is suppressed from flowing outside the area R pressed by the bonding pressing surface 11, that is the area on the photographic papers 1A and 1B between the protrusions 12a and 12b, and being solidified there, whereby generation of granular blocks outside the bonding pressing surface 11 can be suppressed.

In ultrasonic welding under a predetermined condition, the volume of the groove in the bonding pressing surface 11 of the hone 10 is substantially equal to the amount of flow of the molten layer between the protrusions 12a and 12b. That is, the area of the cross-section D3 of the groove in the bonding pressing surface 11 of the hone 10 shown in FIG. 6A is equal to the area of the cross-section D2 of the solidified fluidized body comprising the molten layer M6.

Further, a result of embodying the ultrasonic welding under various conditions reveals that the relation between the fluidized ratio α (the ratio of the amount of flow of the molten layer to the volume of the groove in the bonding pressing surface 11 of the hone 10) and the web bonding strength and the relation between the fluidized ratio α and the squeeze-out of the fluidized body from the bonding pressing surface are as follows.

That is, as shown in FIG. 7, when the fluidized ratio α was not smaller than 1.2, the squeeze-out of the fluidized body was unacceptable(x), when the fluidized ratio α was not smaller than 1.1 and smaller than 1.2, the squeeze-out of the fluidized body was acceptable (Δ) and when the fluidized ratio α was smaller than 1.1, the squeeze-out of the fluidized body was good (○). When the fluidized ratio α was not smaller than 1.3 and when the fluidized ratio α was smaller than 0.8, the web bonding strength was unacceptable(x), when the fluidized ratio α was smaller than 1.3 and not smaller than 1.2, the web bonding strength was acceptable (Δ) and when the fluidized ratio α was smaller than 1.2 and not smaller than 0.9, the web bonding strength was good (○). When the fluidized ratio α was close to 1.0, the web bonding strength was especially good (⊙). When the squeeze-out of the fluidized body is unacceptable(x), the fluidized body flows outside the bonding pressing surface and a lot of granular blocks are generated, when the squeeze-out of the fluidized body was acceptable (Δ), few of the fluidized body flows outside the bonding pressing surface and granular blocks are hardly generated, when the squeeze-out of the fluidized body was good (◯), almost no fluidized body flows outside the bonding pressing surface and no granular blocks is generated.

From above, it will be understood that when the fluidized ratio α is not smaller than 0.8 and smaller than 1.2, an ultrasonic welding can be performed at a predetermined quality. A higher quality ultrasonic welding can be performed, when the fluidized ratio α is not smaller than 0.9 and smaller than 1.1.

The bonding pressing surface of the hone need not be a circumferential surface but may be a flat surface. FIG. 8 shows a hone 110 whose bonding pressing surface 111 is flat. Even in this case, the same result can be obtained when the bonding pressing surface 111 has protrusions 112A and 112B extending in one direction on opposite sides of the bonding pressing surface 111 spaced from each other in the direction of width of the bonding pressing surface 111. When ultrasonic welding is performed with the hone 110, the webs to be bonded are pressed by the bonding pressing surface 111 of the hone 110 without rotating the hone 110.

Each of the protrusions need not be continuous in said one direction but may be discontinuous to obtain the above result.

The ultrasonic welding by the use of the ultrasonic bonding hone of the present invention can be applied to webs of any kind so long as the webs have a layer which is melt in response to provision of ultrasonic energy including the photographic papers on which a digital image is printed without being limited to the photographic papers on which print is made by the use of a developed silver-salt film.

What is claimed is:

1. An ultrasonic bonding horn provided with a bonding pressing surface which extends in one direction and on which ultrasonic wave energy is concentrated, wherein the improvement comprises that
    the bonding pressing surface is provided with a pair of protrusions delimiting an interior area of the bonding pressure surface and extending parallel to said one direction on opposite sides of the bonding pressing surface spaced from each other in the direction of width of the bonding pressing surface,
    wherein said bonding pressing surface comprises, between said protrusions, a plurality of projections and recesses arranged in a stripe pattern, said projections extending in the same direction as said protrusions, and
    wherein:
    the space (U1) between the protrusions (12a and 12b) is 4.6 mm,
    the distances (U2) between tops (P1) of the protrusions (12a and 12b) and bottoms (Q) of said recesses in the bonding pressing surface (11) are the same as for the protrusions (12a and 12b) and are 0.1 mm,
    the radii (U3) of curvature of chamfers of the protrusions (12a and 12b) at said edges of the bonding pressure surface are the same as for the protrusions (12a and 12b) and are 0.2 mm,
    the pitch (U4) of the stripe pattern is 0.76 mm, and
    the distances (U5) between tops (P2) of the projections of the stripe pattern and the bottoms (Q) of said recesses in the bonding pressing surface (11) are the same and are 0.1 mm.

2. An ultrasonic bonding horn provided with a bonding pressing surface which extends in one direction and on which ultrasonic wave energy is concentrated, wherein the improvement comprises that
    the bonding pressing surface is provided with a pair of protrusions delimiting an interior area of the bonding pressure surface and extending parallel to said one direction on opposite sides of the bonding pressing surface spaced from each other in the direction of width of the bonding pressing surface,
    wherein the bonding pressing surface is a circumferential surface, and the opposite exterior edges are opposite exterior circumferential edges,
    wherein said bonding pressing surface comprises, between said protrusions, a plurality of projections and recesses arranged in a stripe pattern, said projections extending in the same direction as said protrusions, and
    wherein the space (U1) between the protrusions (12a and 12b) is 4.6 mm,
    the distances (U2) between tops (P1) of the protrusions (12a and 12b) and bottoms (Q) of said recesses in the bonding pressing surface (11) are the same as for the protrusions (12a and 12b) and are 0.1 mm,
    the radii (U3) of curvature of chamfers of the protrusions (12a and 12b) at said edges of the bonding pressure surface are the same as for the protrusions (12a and 12b) and are 0.2 mm,
    the pitch (U4) of the stripe pattern is 0.76 mm, and
    the distances (U5) between tops (P2) of the projections of the stripe pattern and the bottoms (Q) of said recesses in the bonding pressing surface (11) are the same and are 0.1 mm.

3. A rotatable ultrasonic bonding horn provided with a bonding pressing surface which extends in one direction and on which ultrasonic wave energy is concentrated, wherein the improvement comprises that
    the bonding pressing surface is provided with a pair of protrusions delimiting an interior area of the bonding pressure surface and extending parallel to said one direction on opposite exterior edges of the bonding pressing surface spaced from each other in the direction of width of the bonding pressing surface;
    wherein the bonding messing surface is a circumferential surface, and the opposite exterior edges are opposite exterior circumferential edges;
    wherein said protrusions are located so as to prevent a fluidized body, which is fluidized by the ultrasonic wave energy, from flowing into an area outside said bonding pressing surface, said fluidized body being formed from resin and emulsion layers of overlapping photographic papers to be ultrasonically bonded at said bonding pressure surface.

4. The ultrasonic bonding horn as defined in claim 3, wherein said bonding pressing surface comprises, between said protrusions, a plurality of projections and recesses arranged in a stripe pattern, said projections extending in the same direction as said protrusions.

* * * * *